United States Patent
Wagner

(10) Patent No.: US 10,753,475 B2
(45) Date of Patent: Aug. 25, 2020

(54) SEALING RING OF A TRANSLATIONALLY ADJUSTABLE COMPONENT

(71) Applicant: Herbert Haenchen GmbH & Co. KG, Ostfildern (DE)

(72) Inventor: Herrn Klaus Wagner, Reichenbach an der Fils (DE)

(73) Assignee: HERBERT HAECHEN GMBH & CO. KG (DE)

( * ) Notice: Subject to any disclaimer, the term of this patent is extended or adjusted under 35 U.S.C. 154(b) by 160 days.

(21) Appl. No.: 15/847,899

(22) Filed: Dec. 19, 2017

(65) Prior Publication Data
US 2018/0172161 A1    Jun. 21, 2018

(30) Foreign Application Priority Data

Dec. 20, 2016 (DE) .......................... 10 2016 225 551

(51) Int. Cl.
*F16J 15/3204* (2016.01)
*F16J 15/3208* (2016.01)
*F16J 15/3284* (2016.01)

(52) U.S. Cl.
CPC ....... *F16J 15/3204* (2013.01); *F16J 15/3208* (2013.01); *F16J 15/3284* (2013.01)

(58) Field of Classification Search
CPC ... F16J 15/3204; F16J 15/3284; F16J 15/3208
See application file for complete search history.

(56) References Cited

U.S. PATENT DOCUMENTS

| 2,336,250 | A | * | 12/1943 | Hein | F16J 15/3204 |
| | | | | | 277/515 |
| 2,385,045 | A | * | 9/1945 | Wallace | F16J 15/3204 |
| | | | | | 188/322.16 |
| 2,538,198 | A | * | 1/1951 | Hosford | F16J 15/328 |
| | | | | | 277/572 |

(Continued)

FOREIGN PATENT DOCUMENTS

| DE | 1983355 U | 4/1968 | |
| DE | 2658428 A1 | * 5/1978 | ............. F16J 15/166 |

(Continued)

OTHER PUBLICATIONS

English abstract for DE-19532085.
English abstract for DE-3443278.
European Search Report dated Apr. 18, 2018.

*Primary Examiner* — Eugene G Byrd
(74) *Attorney, Agent, or Firm* — Fishman Stewart PLLC

(57) ABSTRACT

A sealing ring of a translationally adjustable component may include a ring body including at least one sealing lip, and a fibre-reinforced reinforcement ring configured to stiffen the ring body in a radial direction and limit a deformation of the at least one sealing lip in the radial direction. The reinforcement ring may be one of i) coupled to the at least one sealing lip, and ii) embedded into the ring body. The reinforcement ring may include laminated carbon fibres and have a modulus of elasticity E2. The ring body may be composed of a plastic having a modulus of elasticity E1. The sealing ring may also have a ratio of the modulus of elasticity E2 to the modulus of elasticity E1 (E2/E1) that is approximately 150 to 300.

17 Claims, 2 Drawing Sheets

(56) References Cited

U.S. PATENT DOCUMENTS

| | | | | |
|---|---|---|---|---|
| 2,927,831 | A * | 3/1960 | Tuczek | F16J 15/3204 277/467 |
| 3,957,278 | A * | 5/1976 | Rabe | B29C 45/1639 277/549 |
| 4,093,245 | A * | 6/1978 | Connor | F16J 15/3284 126/285 A |
| 4,185,843 | A * | 1/1980 | Beyer | F16J 9/26 277/441 |
| 4,446,085 | A * | 5/1984 | Earsley | B29C 45/0013 264/108 |
| 4,447,929 | A * | 5/1984 | Hennig | F16J 15/3204 15/236.01 |
| 4,601,476 | A * | 7/1986 | Usher | F01N 13/16 264/103 |
| 4,645,215 | A | 2/1987 | Fuchs et al. | |
| 4,911,454 | A | 3/1990 | Rapp et al. | |
| 5,433,452 | A * | 7/1995 | Edlund | F16J 15/3208 277/589 |
| 5,704,615 | A * | 1/1998 | Wheeler | F16J 15/3232 277/574 |
| 6,450,502 | B1 * | 9/2002 | Baehl | F16J 15/164 277/387 |
| 7,478,815 | B2 * | 1/2009 | Jordan | F16J 15/164 277/551 |
| 2005/0248096 | A1 | 11/2005 | Baudry et al. | |
| 2017/0343109 | A1 * | 11/2017 | Maeda | F16J 9/14 |
| 2018/0355977 | A1 * | 12/2018 | Tanner | F16J 15/3228 |

FOREIGN PATENT DOCUMENTS

| | | | |
|---|---|---|---|
| DE | 3443278 | A1 | 5/1986 |
| DE | 3501066 | A1 | 8/1986 |
| DE | 3720930 | A1 | 1/1989 |
| DE | 19532085 | A1 | 3/1997 |
| DE | 102004016039 | A1 | 10/2005 |
| GB | 1142265 | A | 2/1969 |
| GB | 2005382 | A | 4/1979 |
| GB | 2024365 | A | 1/1980 |
| WO | WO-9000693 | A1 * | 1/1990 ............... F15B 1/24 |

* cited by examiner

SEALING RING OF A TRANSLATIONALLY ADJUSTABLE COMPONENT

CROSS-REFERENCE TO RELATED APPLICATIONS

This application claims priority to German Patent Application No. DE 10 2016 225 551.7, filed on Dec. 20, 2016, the contents of which are hereby incorporated by reference in its entirety.

TECHNICAL FIELD

The present invention relates to a sealing ring of a translationally adjustable component. The invention also relates to a hydraulic assembly having at least one such sealing ring.

BACKGROUND

Generic sealing rings for dynamic contact seals are well known and seal off components which move relative to one another, such as for example pistons, which are adjustable translationally back and forth, with respect to corresponding bearings, for example cylinders.

Such sealing rings may have an internal or external sealing action and may be of single-acting or double-acting design. The advantage of such a sealing ring lies in the fact that it requires only a relatively small installation space.

In the case of the sealing rings known from the prior art, by means of a corresponding geometry on a sealing lip, a contact pressure profile is generated which increases with a certain gradient. The contact pressure gradient that results from this is in this case definitive of a lubricating film thickness that is conveyed out under the sealing ring. Here, the steeper said gradient, the thinner the lubricating film that is conveyed out. Here, the thickness of the lubricating film is self-evidently dependent not only on the seal geometry but also on the movement speed, and commonly amounts to a few nanometres. The lubricating film that is conveyed out is in this case not to be regarded as leakage, because a modern sealing ring is even capable of conveying said lubricating film back into a pressure space again counter to the pressure. The entire sealing system is thus sealed off to the outside. To be able to impart their sealing action, such sealing systems or such sealing rings require a preload, which is normally applied by means of elastic elements, for example elastomer rings. Owing to the preload and the resulting friction, however, wear occurs, which in the long-term leads to the sealing action of the sealing ring deteriorating.

SUMMARY

The present invention is therefore concerned with the problem of specifying, for a sealing ring of the generic type, an improved or at least an alternative embodiment which in particular at least reduces the disadvantages known from the prior art.

Said problem is solved according to the invention by means of the subject matter of independent Claim(s). The dependent claims relate to advantageous embodiments.

The present invention is based on the general concept of specifying a completely newly designed sealing ring which is reinforced or stiffened by means of a fibre-reinforced reinforcement ring, wherein the reinforcement ring stiffens the sealing ring at least in a radial direction and limits a deformation of at least one sealing lip at least in the radial direction. The sealing ring according to the invention is in this case used for a translationally adjustable component, in particular a hydraulic piston or a closure, for example in accordance with DIN 3750, and according to the invention, has at least one sealing lip and, fixedly connected thereto or enclosed in said sealing ring, the fibre-reinforced reinforcement ring, which is arranged in particular adjacent to the at least one sealing lip. At the same time, according to the invention, the reinforcement ring has laminated carbon fibres and a modulus of elasticity $E2$, whereas the sealing ring is formed from a plastic with a modulus of elasticity $E1$. A ratio of the moduli of elasticity lies in this case in a range from $150<E2/E1<300$. By means of this novel development, the reinforcement ring prevents the sealing ring and the at least one sealing lip, depending on the arrangement, from undergoing an undesirably great radial expansion or an undesirably great radial compression, whereby a contact pressure of the at least one sealing lip against the sealing surface that is moved relative thereto, along with the associated wear, can be reduced. It is thus possible, even in the case of very poor lubrication in the short-stroke range or long periods of operating performance, for the wear to be drastically reduced. By means of the carbon-fibre-reinforced reinforcement ring according to the invention, the wear can, for example in relation to a metal ring, be minimized to such an extent that there is only a minor effect on the friction characteristics of the friction partner, for example of the cylinder. Here, a sealing action of the sealing ring according to the invention is not or only marginally restricted in relation to a sealing action of conventional sealing rings. The advantage of the sealing ring according to the invention is that, in the case of short travel amplitudes (short movement travels), there is no lubrication deficiency under the sealing lip, and therefore no wear occurs even in the case of a high number of load cycles.

In an advantageous refinement of the solution according to the invention, the modulus of elasticity $E1$ of the plastic of the sealing ring amounts to approximately 600 MPa. In addition or alternatively, the modulus of elasticity $E1$ of the reinforcement ring lies in a range from $90\,000\text{ MPa}<E2<180\,000\text{ MPa}$. In this way, during use, the stretching of the sealing ring or of the sealing lips thereof, that is to say for example a contact pressure against the friction partner (oppositely situated sealing surface), can be limited to a value which firstly permits reliable sealing but secondly considerably reduces a degree of wear. The reinforcement ring is formed from laminated carbon fibres.

In a further advantageous embodiment of the solution according to the invention, the sealing ring has a U-shaped recess in the form of a ring-shaped groove, in which the reinforcement ring is received in positively locking fashion and wherein the recess is arranged between two adjacent sealing lips. Such a U-shaped recess may for example be arranged centrally on an outer surface of the sealing ring, such that in this case, a double-acting seal with an external sealing action and with two sealing lips directly adjacent to the reinforcement ring can be created, wherein the reinforcement ring stiffens the sealing lips not only in a radial direction but also in an axial direction, because said sealing lips can be supported on said reinforcement ring depending on the stroke movement. A sealing ring designed in this way may for example be used as a piston sealing ring between a piston and a cylinder. It is self-evidently alternatively also conceivable for the U-shaped recess to be arranged centrally on an inner surface of the sealing ring, such that in this case, a sealing ring formed in this manner is formed as a sealing ring with an internal sealing action, and can be used as a rod seal between, for example, a piston rod and a closure.

In a particularly preferred embodiment, a ratio of a radial wall thickness $t_{DR}$ of the sealing ring to a radial depth to of the recess lies in the range from $1.5 < t_{DR}/t_A < 2.3$, in particular in the range from $1.7 < t_{DR}/t_A < 2.2$. Alternatively or in addition, a ratio of a width $B_{DR}$ of the sealing ring to a width $B_A$ of the recess lies in the range from $1.0 < B_{DR}/B_A < 2.2$, in particular in the range from $1.7 < B_{DR}/B_A < 2.0$. By means of these ratios, the limitation of the deformation can be optimally realized in a pressure range of a hydraulic medium between 20 and 350 bar. Here, by means of the stated dimensions, it is possible according to the invention for the contact pressure of the sealing lips against the oppositely situated sealing surface to be limited to a value at which the sealing action is still fully imparted, but excessive wear as a result of an excessively high contact pressure is avoided.

In an alternative and advantageous embodiment of the sealing ring according to the invention, the sealing ring has a single sealing lip and an internally or externally situated step on which the reinforcement ring is arranged adjacent to the sealing lip. In the case of an externally situated step, it is thus possible for a single-acting sealing ring with an external sealing action and with a single sealing lip to be provided, wherein a connection of the reinforcement ring to the sealing ring may be realized for example by means of adhesive bonding or welding to the material of the sealing ring, or as a result of the process of the carbon winding method production process. The reinforcement ring having carbon fibres can accordingly be produced for example in the winding method.

In an advantageous refinement of the solution according to the invention, the sealing ring is itself formed from polytetrafluoroethylene (PTFE), polyoxymethylene (POM), polyamide (PA), polyethylene (PE), polyurethane (PU) or ultra-high-molecular-weight polyethylene (UHMW-PE), and thus exhibits not only relatively high wear resistance but also high chemical resistance with respect to, in particular, hydraulic media. Depending on the plastic used, the reinforcement ring must be correspondingly designed to realize the ratio of the moduli of elasticity E2/E1 according to the invention.

The present invention is furthermore based on the general concept of equipping a hydraulic assembly having a second component, for example a hydraulic piston, which is translationally adjustable in a first component, for example a cylinder, which second component/hydraulic piston has a recess, with a sealing ring of said type in the recess, and additionally preloading the sealing ring against a sealing surface, in particular against a cylinder barrel, by means of an elastomer ring. Furthermore, elastomer ring provides secondary static sealing of the sealing ring. Depending on whether the sealing ring is a sealing ring with an external sealing action or internal sealing action, the elastomer ring that preloads the sealing ring has in this case a relatively small diameter or else a relatively large diameter. Here, the elastomer ring ensures a contact pressure force of the sealing ring and thus of the sealing lips against the oppositely situated sealing surface, and thereby ensures the desired sealing action. Here, depending on the contact pressure force, it is also possible for a lubricating film thickness between the sealing ring and the oppositely situated sealing surface, for example a cylinder wall, to be adjusted. The sealing ring according to the invention is used for example in a hydraulic assembly, on a piston which is sealed off with respect to a cylinder barrel by means of the sealing ring according to the invention. In the same way, the sealing ring according to the invention may self-evidently also be arranged between a piston rod of the hydraulic piston and a closure, wherein, in this case, said sealing ring would be in the form of a seal with internal sealing action.

Further important features and advantages of the invention will emerge from the subclaims, from the drawings and from the associated figure description on the basis of the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, wherein the same reference designations are used to denote identical or similar or functionally identical components.

DETAILED DESCRIPTION

Figure 1:
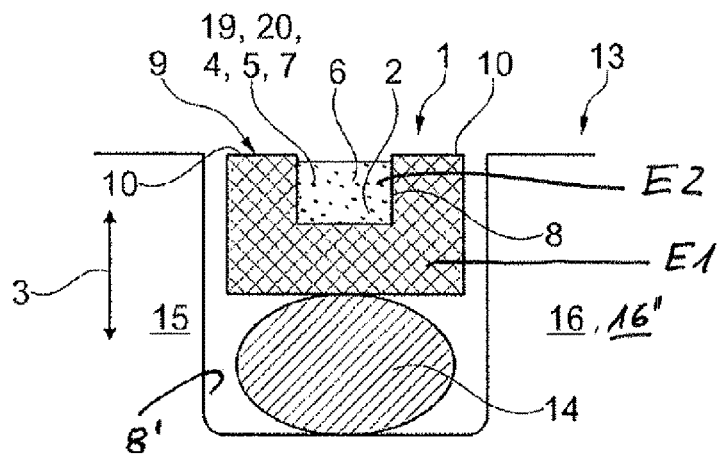
FIG. 1 shows a sectional illustration through a double-acting sealing ring according to the invention with external sealing action.

Correspondingly to FIGS. 1 to 5, a sealing ring 1 according to the invention of a translationally adjustable component 16, in particular of a hydraulic piston 16', has a reinforcement ring 2 which is fixedly connected thereto or enclosed in said sealing ring and which is constructed from laminated carbon fibres 4, which reinforcement ring stiffens the sealing ring 1 in a radial direction 3 and limits a deformation of at least one sealing lip 10 in the radial direction 3 and/or in an axial direction. The reinforcement ring 2 may purely theoretically additionally also have aramid fibres 5, glass fibres 19, mineral fibres 20, in particular basalt fibres, and/or metal fibres 7 embedded in plastic 6.

By means of the carbon fibres 4, which normally extend in the circumferential direction of the sealing ring 1, it is possible in particular for forces acting radially on the sealing ring 1 to be diverted into and accommodated in a circumferential direction. The reinforcement ring 2 has a modulus of elasticity E2. The carbon fibres 4 are laminated, that is to say the reinforcement ring has multiple layers of carbon fibres 4 adhesively bonded to one another. According to the invention, the sealing ring 1 is formed from a plastic with a modulus of elasticity E1, wherein a ratio of the moduli of elasticity amounts to $150 < E2/E1 < 300$. By means of the carbon-fibre-reinforced reinforcement ring 2 according to the invention, the sealing ring 1 is prevented from undergoing excessive radial stretching (cf. FIGS. 1, 2 and 4) or radial compression (cf. FIGS. 3 and 5), and thus the wear of said sealing ring is considerably reduced in relation to conventional sealing rings. It is thus possible, even in the case of very poor lubrication in the short-stroke range or long periods of operating performance, for the wear to be drastically reduced. Here, a sealing action of the sealing ring 1 according to the invention is not or only marginally restricted in relation to a sealing action of conventional sealing rings. The advantage of the sealing ring 1 according to the invention is that, in the case of short travel amplitudes (short movement travels), there is no lubrication deficiency under the sealing lip 10, and therefore no wear occurs even in the case of a high number of load cycles.

The modulus of elasticity E1 of the plastic of the sealing ring 1 amounts to approximately 600 MPa, wherein the modulus of elasticity E2 of the reinforcement ring 2 lies in a range from 90 000 MPa<E2<180 000 MPa. In this way, during use, the stretching of the sealing ring 1 or of the sealing lips 10 thereof, that is to say for example a contact pressure against the friction partner (oppositely situated sealing surface 12), can be limited to a value which firstly permits reliable sealing but secondly considerably reduces a degree of wear. The reinforcement ring 2 is in this case a laminate which has carbon fibres 4.

Figure 2:
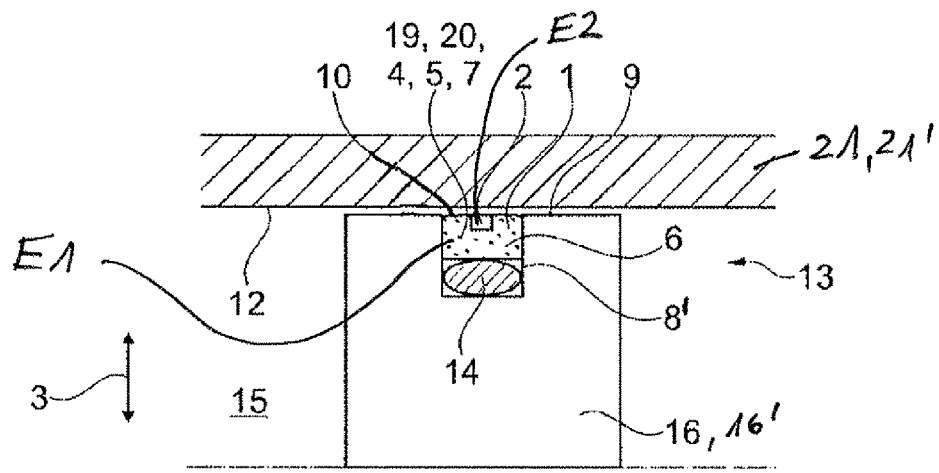
FIG. 2 shows an illustration as in FIG. 1 in a usage situation in a hydraulic piston of a hydraulic assembly.
Figure 4:
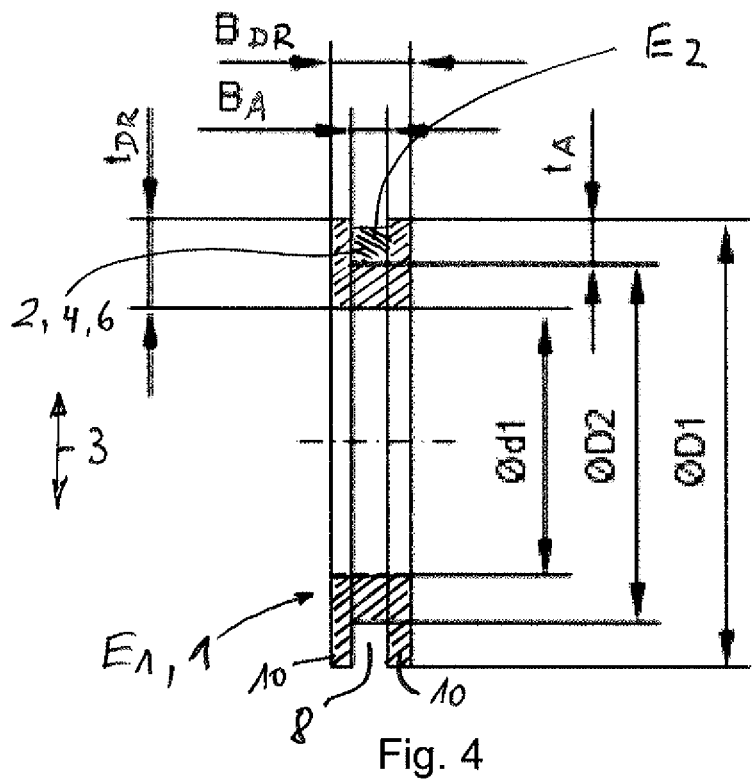
FIG. 4 shows a sectional illustration through a double-acting sealing ring according to the invention with external sealing action, with dimensions labelled.

Considering in particular the sealing ring 1 as per FIGS. 1, 2 and 4, it can be seen that said sealing ring has a U-shaped recess 8 in which the reinforcement ring 2 is received in positively locking fashion and directly adjacent to the sealing lips 10. The reinforcement ring 2 may furthermore be adhesively bonded or fastened in some other way in the receptacle 8, wherein it is self-evidently also conceivable for the reinforcement ring 2 to be embedded into the material of the sealing ring 1, and thus connected thereto in non-positively locking fashion, already during the process of production of the sealing ring 1. The U-shaped recess 8 may in this case be arranged centrally on an outer surface 9 of the sealing ring 1, such that the sealing ring 1 as per FIGS. 1 and 2 is accordingly formed as a sealing ring 1 with external sealing action and with two sealing lips 10.

Figure 3:
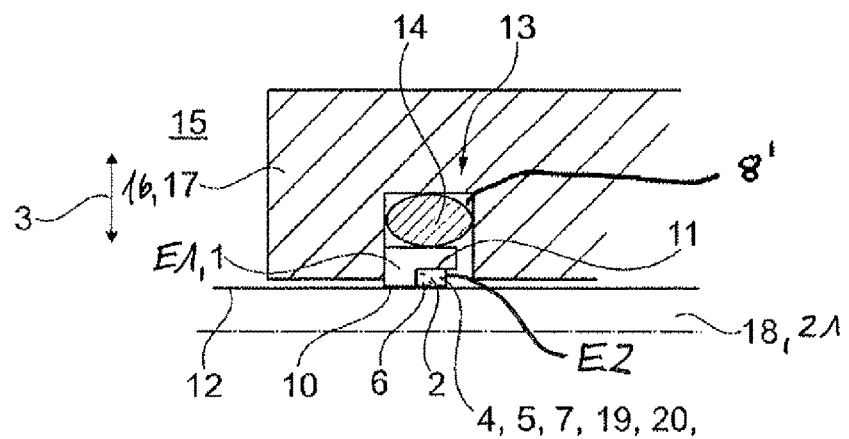
FIG. 3 shows a further possible embodiment of the sealing ring according to the invention in the case of a rod seal in a hydraulic assembly.
Figure 5:
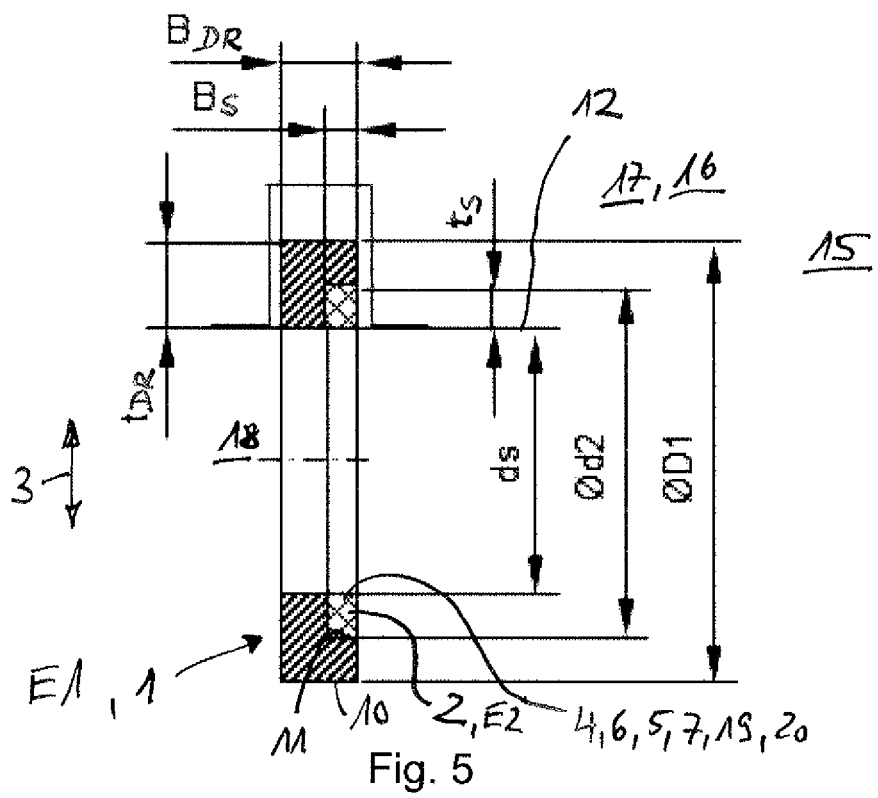
FIG. 5 shows a sectional illustration through a single-acting sealing ring according to the invention with internal sealing action, with dimensions labelled.

Considering the sealing ring 1 illustrated in FIGS. 3 and 5, it is possible to see an internally situated step 11 on said sealing ring, on which step the fibre-reinforced reinforcement ring 2 is arranged. The sealing ring 1 illustrated in FIGS. 3 and 5 is in this case in the form of a single-acting sealing ring 1 with an internal sealing action and with only one sealing lip 10. The embodiments of the sealing ring 1 illustrated in FIGS. 1 to 5 are intended here to be understood merely purely as examples, such that further embodiments (not shown) of the sealing ring 1 are self-evidently also intended to be encompassed by the invention, if these have at least the reinforcement ring 2 which is connected to or enclosed in the material of the sealing ring 1 and which stiffens the sealing ring 1 at least in the radial direction 3.

Considering the sealing ring 1 as per FIG. 4, it can be seen that a ratio of a radial wall thickness $t_{DR}$ of the sealing ring 1 to a radial depth $t_A$ of the recess 8 lies in the range from $1.5 < t_{DR}/t_A < 2.3$, in particular in the range from $1.7 < t_{DR}/t_A < 2.2$. Alternatively or in addition, a ratio of a width $B_{DR}$ of the sealing ring 1 to a width $B_A$ of the recess 8 lies in the range from $1.0 < B_{DR}/B_A < 2.2$, in particular in the range from $1.7 < B_{DR}/B_A < 2.0$.

Considering the sealing ring 1 as per FIG. 5, it can be seen that a ratio of a radial wall thickness $t_{DR}$ of the sealing ring 1 to a radial depth $t_S$ of the step 11 lies in the range from $1.5 < t_{DR}/t_S < 2.3$, in particular in the range from $1.7 < t_{DR}/t_S < 2.2$. Alternatively or in addition, a ratio of a width $B_{DR}$ of the sealing ring 1 to a width $B_S$ of the step 11 lies in the range from $1.0 < B_{DR}/B_S < 2.2$, in particular in the range from $1.7 < B_{DR}/B_S < 2.0$.

By means of these ratios, the limitation of the deformation can be optimally realized in a pressure range of a hydraulic medium between 20 and 350 bar. Here, by means of the stated dimensions, it is possible according to the invention for the contact pressure of the sealing lips 10 against the oppositely situated sealing surface 12 to be limited to a value at which the sealing action is still fully imparted, but excessive wear as a result of an excessively high contact pressure is avoided.

Here, the reinforcement ring 2 may also be arranged centrally in the sealing ring 1, in particular completely enclosed by the material of the sealing ring 1, whereby a double-acting sealing ring 1 is realized.

Here, in the case of the sealing rings 1 as per FIGS. 1, 2 and 4, the reinforcement ring 2 is arranged radially at the outside on the sealing ring 1, and thus stiffens the sealing ring 1 and the sealing lips 10 against a pressure toward the outside, in this case upward, that is to say against radial stretching. By contrast, the reinforcement ring 2 on the sealing ring 1 as per FIGS. 3 and 5 is arranged at the inside, and thus stiffens the sealing ring 1 and the sealing lips 10 against radial compression.

The sealing ring 1 itself may in this case be formed from virtually any desired materials, preferably from polyurethane (PU), from polytetrafluoroethylene (PTFE), polyamide (PA), polyethylene (PE) or other thermoplastic materials, wherein polyurethanes are plastics or synthetic resins which have excellent mechanical characteristics and thus a high degree of wear resistance. By contrast, polytetrafluoroethylene (PTFE) is an unbranched, partially crystalline polymer, of linear construction, composed of fluorine and carbon, which exhibits extremely high chemical resistance and furthermore also high wear resistance. Furthermore, a reinforcement ring 2 formed from PTFE has excellent sliding characteristics, whereby only low friction arises even in the case of a deficiency of lubrication in the sliding contact with an oppositely situated sealing surface 12.

The sealing ring 1 according to the invention is used in a seal arrangement 13, wherein, in said seal arrangement 13, there is also provided an elastomer ring 14 which preloads the sealing ring 1 in particular against the sealing surface 12, for example a cylinder barrel, or a piston rod 18, specifically radially outward in FIGS. 1, 2 and 4 and radially inward in FIGS. 3 and 5.

FIG. 2 shows a hydraulic assembly 15 having a second component 16, in this case a hydraulic piston 16', which is translationally adjustable in/on a first component 21, in this case a cylinder 21', and which has a recess 8' in which a sealing ring 1 is arranged. Here, the sealing ring 1 is preloaded by means of an elastomer ring 14 against a sealing surface 12 of the first component 21, that is to say of the cylinder 21'. Here, the sealing ring 1 and the elastomer ring 14 form a seal arrangement 13.

Correspondingly to FIG. 3, the first component 21 is formed as a piston rod 18, and the second component 16 is formed as a closure 17. Here, the seal arrangement 13 as per FIG. 3 seals off the closure 17 with respect to the piston rod 18 in a radially inward direction. Even this non-exhaustive list is indicative of the wide variety of possible uses for the sealing ring 1 or the seal arrangement 13.

The elastomer ring 14 may be formed from nitrile rubber (NBR), fluororubber (FKM), ethylene propylene diene rubber (EPDM) or polyurethane (PU). The advantages of the individual materials are based for example on the chemical resistance with respect to the media to be sealed off, and on the control of the wear characteristics and of the friction.

In summary, it can thus be stated that, with the sealing ring 1 according to the invention, a seal which both imparts a sealing action and is wear-resistant, in particular in hydraulic assemblies 15, can be realized.

The invention claimed is:

1. A sealing ring of a translationally adjustable component, comprising: a ring body including at least one sealing lip; and a fibre-reinforced reinforcement ring configured to stiffen the ring body in a radial direction and limit a deformation of the at least one sealing lip in the radial direction; wherein the reinforcement ring is one of i) coupled to the at least one sealing lip, and ii) embedded into the ring body; wherein the reinforcement ring includes laminated carbon fibres and has a modulus of elasticity E2; wherein the ring body is composed of a plastic having a modulus of elasticity E1; wherein a ratio of the modulus of elasticity E2 to the modulus of elasticity E1 (E2/E1) is approximately 150 to 300; wherein the at least one sealing lip includes a single sealing lip and a step situated one of internally and externally; wherein the reinforcement ring is arranged on the step and adjacent to the single sealing lip; and wherein a ratio of a radial wall thickness tDR of the ring body to a radial depth tS of the step is 1.5 to 2.3.

2. The sealing ring according to claim 1, wherein the modulus of elasticity E1 is approximately 600 MPa.

3. The sealing ring according to claim 1, wherein the modulus of elasticity E2 is 90,000 MPa to 180,000 MPa.

4. The sealing ring according to claim 1, wherein a ratio of a width BDR of the ring body to a width BS of the step is 1.0 to 2.2.

5. The sealing ring according to claim 1, wherein the ratio of the radial wall thickness tDR to the radial depth tS is 1.7 to 2.2.

6. The sealing ring according to claim 4, wherein the ratio of the width BDR to the width BS is 1.7 to 2.0.

7. The sealing ring according to claim 1, wherein the carbon fibres extend in a substantially circumferential direction of the sealing ring.

8. A hydraulic assembly, comprising: a first component; a second component translationally adjustable across the first component, the second component including a component recess; an elastomer ring; a sealing ring arranged within the component recess, the sealing ring including: a ring body composed of a plastic having a modulus of elasticity E1, the ring body including at least one sealing lip; and a fibre-reinforced reinforcement ring including laminated carbon fibres, the reinforcement ring having a modulus of elasticity E2 and configured to stiffen the ring body in a radial direction and limit a deformation of the at least one sealing lip in the radial direction; wherein the reinforcement ring is one of i) coupled to the at least one sealing lip, and ii) arranged within the ring body; wherein a ratio of the modulus of elasticity E2 to the modulus of elasticity E1 (E2/E1) is approximately 150 to 300; wherein the elastomer ring is configured to preload at least the at least one sealing lip of the sealing ring against a sealing surface of the first component; wherein the at least one sealing lip includes two adjacent sealing lips defining a circumferentially extending recess therebetween; wherein the reinforcement ring is arranged within the recess; and wherein a ratio of a width BDR of the ring body to a width BA of the recess is 1.0 to 2.2.

9. The hydraulic assembly according to claim 8, wherein one of: the first component is structured as a cylinder and the second component is structured as a piston; and the first component is structured as a piston rod and the second component is structured as a closure.

10. The hydraulic assembly according to claim 8, wherein a ratio of a radial wall thickness tDR of the ring body to a radial depth tA of the recess is 1.5 to 2.3.

11. The hydraulic assembly according to claim 8, wherein a radial thickness of the reinforcement ring is at least one of equal to and less than a radial depth tA of the recess.

12. A sealing ring, comprising: a ring body composed of a plastic having a modulus of elasticity E1; two sealing lips extending outwardly from an outer surface of the ring body defining a U-shaped recess therebetween; and a fibre-reinforced reinforcement ring configured to stiffen the ring body in a radial direction and limit deformation of the two sealing lips in the radial direction, the reinforcement ring having a modulus of elasticity E2; wherein the reinforcement ring is one of i) coupled to the two sealing lips, and ii) embedded into the ring body; wherein the reinforcement ring includes at least one of carbon fibres, aramid fibres, glass fibres, mineral fibres, basalt fibres and metal fibers; wherein a ratio of the modulus of elasticity E2 to the modulus of elasticity E1 (E2/E1) is approximately 150 to 300; and wherein a ratio of a radial wall thickness tDR of the ring body to a radial depth tA of the recess is 1.5 to 2.3.

13. The sealing ring according to claim 12, wherein the reinforcement ring is arranged within the recess in a positively locking fashion.

14. The sealing ring according to claim 12, wherein the recess is arranged centrally on an outer surface of the ring body.

15. The sealing ring according to claim 12, wherein a ratio of a width BDR of the ring body to a width BA of the recess is 1.0 to 2.2.

16. The sealing ring according to claim 15, wherein the ratio of the width BDR to the width BA is 1.7 to 2.0.

17. The sealing ring according to claim 12, wherein the ratio of the radial wall thickness tDR to the radial depth to is 1.7 to 2.2.

* * * * *

UNITED STATES PATENT AND TRADEMARK OFFICE
CERTIFICATE OF CORRECTION

PATENT NO. : 10,753,475 B2
APPLICATION NO. : 15/847899
DATED : August 25, 2020
INVENTOR(S) : Herrn Klaus Wagner Page 1 of 1

It is certified that error appears in the above-identified patent and that said Letters Patent is hereby corrected as shown below:

On the Title Page

Item [73], delete "Haechen" and insert --Haenchen--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*